F. WESTERBECK.
SHEET METAL CAN.
No. 11,641. Reissued Dec. 7, 1897.
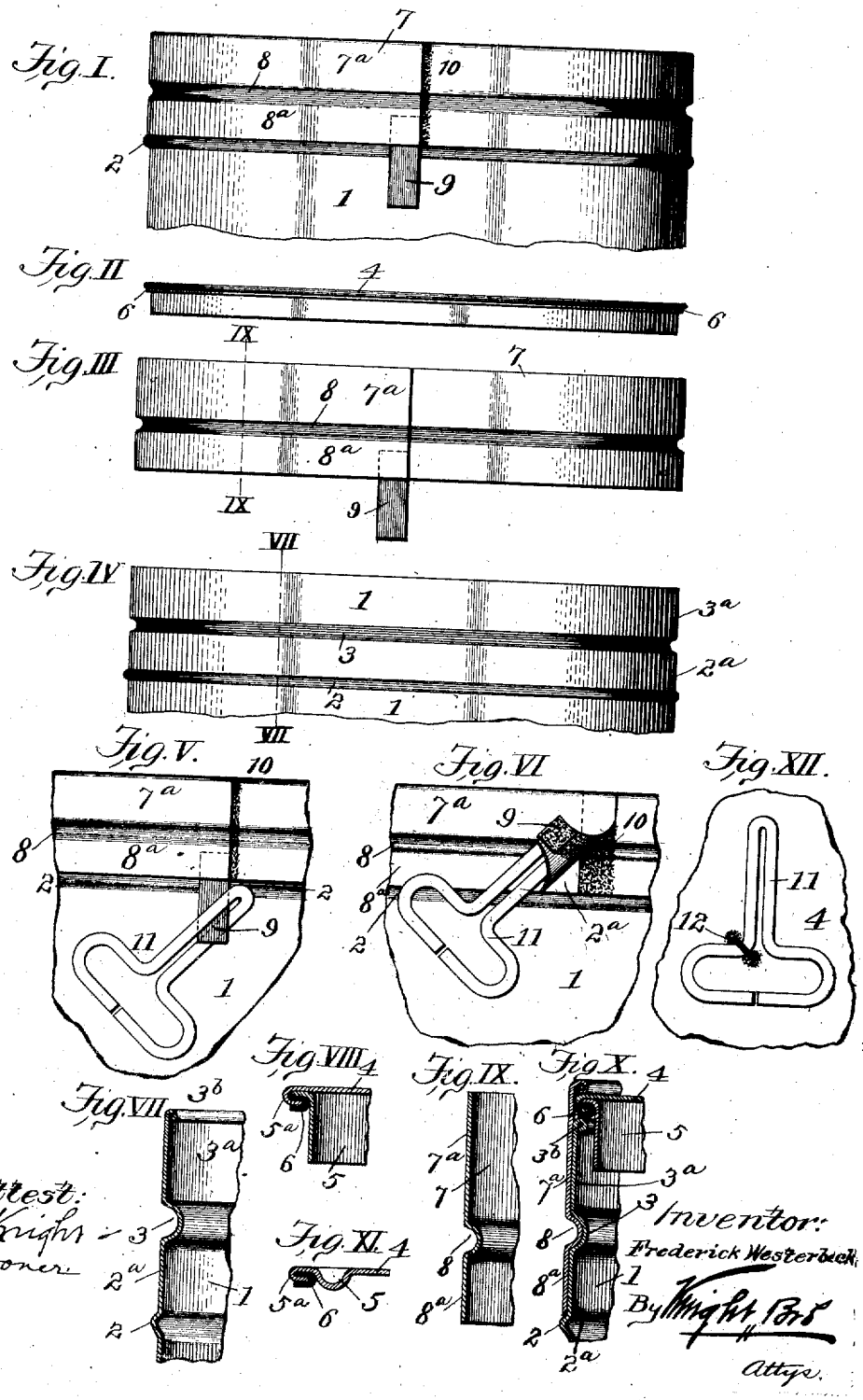

UNITED STATES PATENT OFFICE.

FREDERICK WESTERBECK, OF ST. LOUIS, MISSOURI.

SHEET-METAL CAN.

SPECIFICATION forming part of Reissued Letters Patent No. 11,641, dated December 7, 1897.

Original No. 590,029, dated September 14, 1897. Application for reissue filed November 13, 1897. Serial No. 658,504.

*To all whom it may concern:*

Be it known that I, FREDERICK WESTERBECK, a citizen of the United States, and a resident of the city of St. Louis, in the State of Missouri, have invented a certain new and useful Improvement in Sheet-Metal Cans, of which the following is a full, clear, and exact description, reference being had to the accompanying drawings, forming a part of this specification.

My invention relates to that class of cans known as "key-opening;" and my invention consists in features of novelty hereinafter fully described, and pointed out in the claims.

Referring to the drawings, Figure I is an elevation of the upper end of a can constructed in accordance with my invention. Fig. II is an edge view of the can-cover removed from the body of the can. Fig. III is an elevation of the retaining-band that secures the cover to the body of the can. Fig. IV is an elevation of the upper end of the can-body previous to the attachment of cover and retaining-band. Fig. V is a detail view illustrating the manner of applying the opening-key. Fig. VI illustrates the opening-key applied and the retaining-band, the seal of said band partly broken. Fig. VII illustrates a vertical section taken on line VII VII, Fig. IV, through the upper end of the can-body. Fig. VIII illustrates a section through the edge of the can-cover. Fig. IX illustrates a section taken on line IX IX, Fig. III. Fig. X is a detail section of the upper end of the can with the cover attached. Fig. XI is a detail section of another form of can-cover. Fig. XII is a detail view illustrating a manner of attaching the key to the can-cover.

In the drawings, 1 designates the body of the can, which is provided with an outwardly-projecting annular bead 2, a plain cylindrical portion $2^a$, surmounting the annular bead, an inwardly-projecting annular groove 3, located above the cylindrical portion, and a plain cylindrical portion $3^a$, surmounting the annular groove. The top of the can is preferably curved inward, as shown at $3^b$ in Figs. VII and X, to provide a smooth end on which the cover rests.

4 designates the can-cover. This cover may be of the form shown in Fig. VIII or of the form shown in Fig. XI, and has an inwardly-projecting rim 5. The outer edge of the cover is curled inward to provide a horizontal flange $5^a$ for the purpose of retaining a horizontal folded packing-strip 6. By thus attaching the packing-ring to the cover there is no liability of the former being displaced as the can-cover is slipped into position, so that when the can is finally sealed the packing-ring will be in position and will form a liquid-tight joint between the cover and can-body. When the cover is placed upon the body of the can, the packing-strip 6 rests upon the curled end of the can-body.

7 designates a retaining-band provided with a plain cylindrical portion $7^a$, an inwardly-projecting bead 8 beneath the cylindrical portion, and a plain cylindrical portion $8^a$ beneath the bead and having attached to one of its ends a tongue 9.

In putting the parts together the preferred *modus operandi* is to first form the bead and the groove in the body of the can, and then the band, after being soldered, is slipped over the body and pressed down until its lower edge rests against the bead on the body. A groove is now made in the band opposite the groove in the body, thereby forming the internal bead on the band that fits in the groove in the body of the can. The cover can now be applied, which is done, of course, after the can is filled, and the upper edge of the band is then rolled down onto the cover, as clearly illustrated in Fig. X, thus effectually binding the cover against the can-body, and the packing-strip 6 effects a tight joint between the body and cover. The bead 2 supports and prevents downward movement of the retaining-band 7, and the bead 8, fitting in the groove 3, prevents upward movement of the band in the act of rolling the upper edge of the band over onto the can-cover, and the bead 8, fitting in the groove 3, forms a union between the band and the can-body after the can is closed, thus holding the cover down tightly on the can-top. The band lies snugly up against and in contact with the body of the can, and this, together with the fact that the lower edge of the band rests on the bead 2, avoids any buckling of the band as its upper edge is turned over the cover as the can is being closed.

11 designates the opening-key, which is of a common form and upon which no invention is herein claimed. As a means of attaching the key 11 to the can-cover I provide an eye 12, soldered or otherwise suitably secured to the can-cover. By passing one end of the key 11 through the eye 12 the key may be readily inserted through the eye and retained therein. This arrangement is quite convenient also in removing the cover from the can after the retaining-band has been removed, as the key may be passed through the eye and be employed as a handle to withdraw the cover.

To remove the retaining-band, the key 11 is applied to the tongue 9 in the manner illustrated in Fig. V, and by turning the key first the tongue and then the end of the band to which it is attached is wound around the key, as illustrated in Fig. VI, and thus the seal of the ends of the band is broken, when the band may be readily removed and the cover is free to be withdrawn.

I claim as my invention—

1. A sheet-metal can comprising a body, a cover, and a band adapted to be turned over the cover and which is beaded to the body so as to be held from vertical movement thereon without being soldered thereto; said band having its ends soldered together, and one end of which is provided with a tearing-tongue for disengaging said ends and thereby releasing the cover; substantially as set forth.

2. A sheet-metal can comprising a body formed with an outwardly-projecting annular bead, with a plain cylindrical portion surmounting the bead, with an annular groove located above the cylindrical portion and with a plain cylindrical portion surmounting the groove having an inturned curl, a cover seating on the inturned curl, and a cover-retaining band formed with a plain cylindrical portion having its lower edge seating on the bead of the body, with an annular bead fitting in the groove of the body and with a plain cylindrical portion located above its bead and having its upper edge extending above the body and adapted to be rolled over the edge of the cover; the cover-retaining band being soldered at its ends only; substantially as described.

3. A sheet-metal can comprising a body formed with an outwardly-projecting annular bead, with a plain cylindrical portion surmounting the bead, with an inwardly-projecting annular groove located above the cylindrical portion and with a plain cylindrical portion surmounting the groove having an inturned curl, a cover seating on the inturned curl, and a cover-retaining band formed with a plain cylindrical portion having its lower edge seating on the bead of the body, with an inwardly-projecting annular bead fitting in the groove of the body and with a plain cylindrical portion located above its bead and having its upper edge extending above the body and adapted to be rolled over the edge of the cover; the cover-retaining band being soldered at its ends only; substantially as described.

4. A sheet-metal can-cover having its edge curled inward so as to provide a horizontal flange, and a horizontal folded packing-strip fitting over the flange; substantially as described.

FREDERICK WESTERBECK.

In presence of—
GEO. H. KNIGHT,
E. S. KNIGHT.